(12) United States Patent
Foley

(10) Patent No.: US 9,684,786 B2
(45) Date of Patent: *Jun. 20, 2017

(54) MONITORING AN APPLICATION IN A PROCESS VIRTUAL MACHINE

(71) Applicant: International Business Machines Corporation, Armonk, NY (US)

(72) Inventor: Sean C. Foley, Chelmsford, MA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/474,961

(22) Filed: Sep. 2, 2014

(65) Prior Publication Data

US 2015/0278511 A1 Oct. 1, 2015

Related U.S. Application Data

(63) Continuation of application No. 14/226,930, filed on Mar. 27, 2014.

(51) Int. Cl.
*G06F 21/52* (2013.01)
*G06F 21/54* (2013.01)
(Continued)

(52) U.S. Cl.
CPC .............. *G06F 21/54* (2013.01); *G06F 21/53* (2013.01); *G06F 21/552* (2013.01)

(58) Field of Classification Search
USPC .......... 726/23, 2, 21, 36; 713/150, 163, 181; 380/255, 264, 276
See application file for complete search history.

(56) References Cited

U.S. PATENT DOCUMENTS 6,738,977 B1 * 5/2004 Berry .................. G06F 9/44563
718/1
8,166,468 B2 4/2012 Foley et al.
(Continued)

FOREIGN PATENT DOCUMENTS

WO 2007133178 A2 11/2007

OTHER PUBLICATIONS

Aarniala, "Instrumenting Java bytecode", Seminar work for the Compilers-course, Spring 2005, Helsinki, Finland.
(Continued)

*Primary Examiner* — Farid Homayounmehr
*Assistant Examiner* — Sharif E Ullah
(74) *Attorney, Agent, or Firm* — Mark G. Edwards

(57) ABSTRACT

An application that runs in a process virtual machine is monitored by injecting listening code into a target class of the application. The listening code collects and forwards data to a monitoring agent. The target class is configured for monitoring according to alternative embodiments. In response to the process virtual machine providing notification of an event, such a loading the target class, the listening code may be injected into the target class. In another embodiment, the process virtual machine is configured to load a first minor class containing a minor entry point to the application. A mirror target class is loaded in response to a request to load the target class. The minor target class contains a minor entry point to the target class and the listening code. In another embodiment, listening code may be added to the target class before running the application.

6 Claims, 8 Drawing Sheets

(51) Int. Cl.
*G06F 21/53* (2013.01)
*G06F 21/55* (2013.01)

(56) References Cited

U.S. PATENT DOCUMENTS

| | | | |
|---|---|---|---|
| 8,627,303 | B2 | 1/2014 | Adams, III et al. |
| 8,713,631 | B1* | 4/2014 | Pavlyushchik ....... G06F 21/566 726/1 |
| 2006/0136886 | A1 | 6/2006 | Patterson et al. |
| 2013/0179971 | A1* | 7/2013 | Harrison ................ G06F 21/55 726/23 |

OTHER PUBLICATIONS

Dunlap et al., "ReVirt: Enabling Intrusion Analysis through Virtual-Machine Logging and Replay", Proceedings of the 2002 Symposium on Operating Systems Design and Implementation (OSDI), 2002. http://www.cs.uiuc.edu/homes/kingst/Research_files/dunlap02.pdf.

Johng et al., "IBM i5/OS Intrusion Detection System", Redpaper, IBM Redbooks, pp. 1-22, © Copyright International Business Machines Corporation 2006.

Soman et al., "Detecting Malicious Java Code Using Virtual Machine Auditing", Proceedings of the 12th USENIX Security Symposium, pp. 153-167, Washington DC, Aug. 2003, © USENIX Association.

Spi Dst et al., "An Overview of Virtual Machine Security Features", IP.com Prior Art Database Technical Disclosure, IP.com No. IPCOM000148883D, Original Publication May 31, 1987, Electronic Publication Mar. 30, 2007, Database entry Copyright (c) Software Patent Institute. http://ip.com/IPCOM/00014883.

Zhou et al., "Detecting Attacks That Exploit Application-Logic Errors Through Application-Level Auditing", 20th Annual Computer Security Applications Conference, 2004, pp. 168-178, © IEEE Computer Society, Washington DC. DOI: 10.1109/CSAC.2004.17.

Unknown, "JVM™ Tool Interface", Oracle, Version 1.2, last modified Sep. 5, 2007 http://docs.oracle.com/javase/7/docs/platform/jvmti/jvmti.html#bci.

Foley, S., "Monitoring an Application in a Process Virtual Machine", U.S. Appl. No. 14/226,930, filed Mar. 27, 2014.

List of IBM Patents or Patent Applications Treated as Related.

* cited by examiner

MONITORING AN APPLICATION IN A PROCESS VIRTUAL MACHINE

BACKGROUND

This disclosure relates to detecting and preventing intrusion into a software application, and auditing of the software application, and more specifically, to monitoring an application that runs in a process virtual machine.

Generally, a virtual machine (VM) is software that emulates a machine, i.e., a computer. Virtual machines may be classified as system or process VMs. The virtualization software of a system VM is sometimes referred to as a hypervisor or virtual machine monitor. A system VM emulates the complete hardware environment of a particular computer, including its instruction set architecture (ISA). One or more guest operating systems (OS) may run on a system VM, and various programs may run on each guest operating system running on the system VM.

On the other hand, the virtualization software of a process VM emulates an application program environment. A process VM is sometimes referred to as an application virtual machine or a managed runtime environment. A process VM runs as an application on a host OS. Applications can be written to run in the environment provided by a process VM and one or more programming languages may be designed for use with a particular process VM. A process VM may provide application binary interfaces and application programming interfaces for use by the application. A process VM generally enables an application to run on different types of hardware without modification. A process VM may be vulnerable to unauthorized accesses that could result in a release of secure data. A process VM is the type of VM in which the embodiments described in the Detailed Description may be implemented.

SUMMARY

Embodiments are directed to a computer-implemented method for monitoring an application that runs in a process virtual machine. The method includes receiving an identification of a target class of an application that runs in a process virtual machine on a computer system to a monitoring agent. The method includes configuring the target class for monitoring by listening code. In addition, the method includes running the monitoring agent, the process virtual machine, and the application on the computer system. Further, the method includes collecting data by the listening code and sending the collected data to the monitoring agent by the listening code. Moreover, the method includes sending the collected data to a collector by the monitoring agent. The collector is operable to analyze the collected data to identify an unauthorized access to the application.

In various embodiments of the method, the configuring the target class for monitoring by listening code may include configuring the process virtual machine to provide a notification of an event concerning the target class. In addition, the configuring the target class may include installing the listening code in the target class in response to the notification of the event. In some embodiments, the event is a request to load the target class.

In other embodiments of the method, the configuring the target class for monitoring by listening code may include configuring the process virtual machine to use a first class loader to load a first mirror class containing a mirror entry point to the application. In addition, the configuring of the target class may include loading a mirror target class in response to a request to load the target class. The minor target class contains a minor entry point to the target class and the listening code.

In yet other embodiments of the method, the configuring the target class for monitoring by listening code may includes adding the listening code to the target class before running the application.

Further embodiments of the method may include serializing the collected data by the monitoring agent. In addition, in various embodiments the collected data may include an argument of a target method the target class.

Additional embodiments are directed to a system and computer program product for monitoring an application that runs in a process virtual machine.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

DETAILED DESCRIPTION

Figure 1:
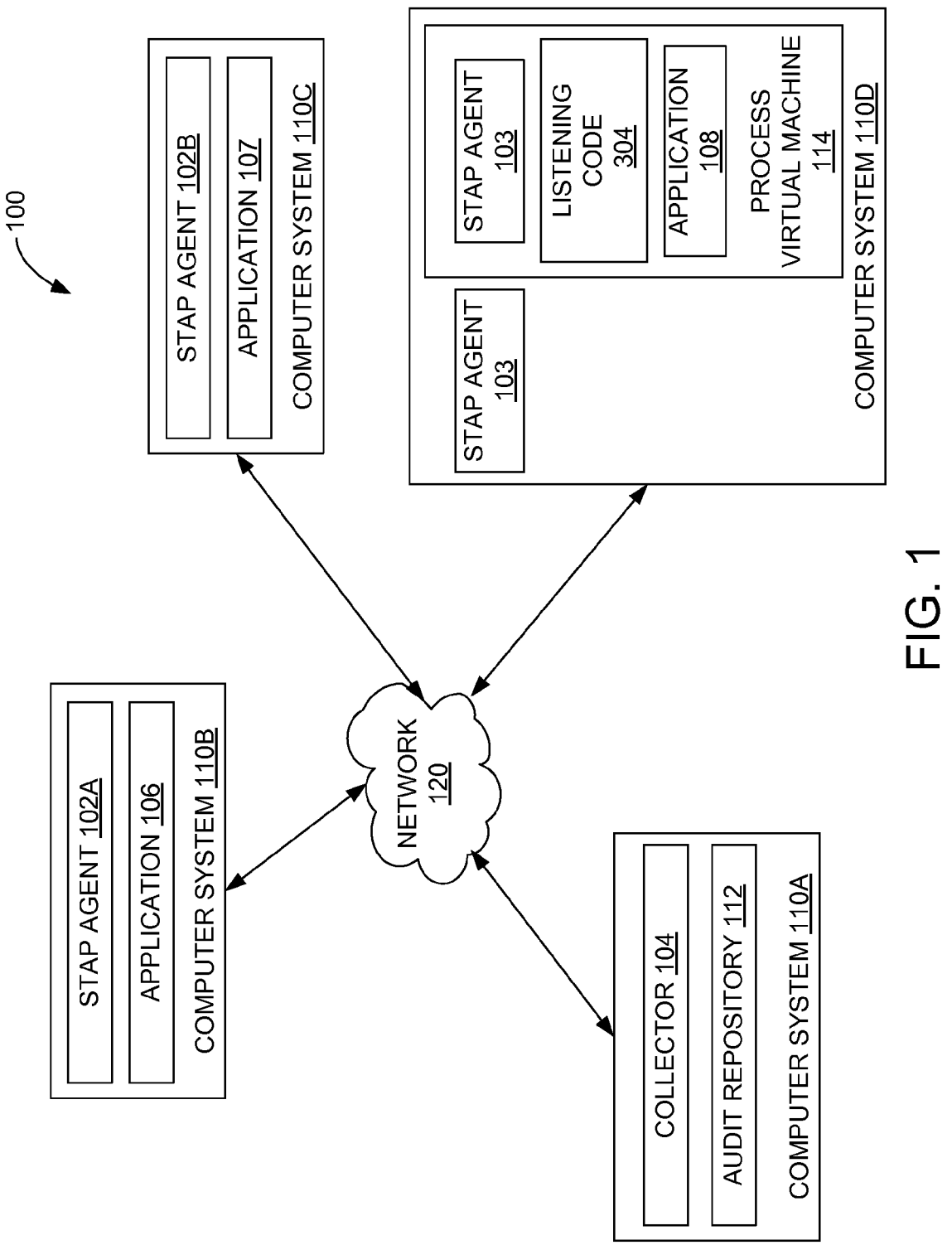
FIG. 1 depicts an example of a system for monitoring an application, or auditing an application, or both, according to various embodiments.

FIG. 1 shows an example of a system 100 for monitoring an application, or auditing an application, or both, according to various embodiments. Components of the system 100 include: one or more STAP agents 102 or 103, and a collector 104. The term STAP agent is from the term software tap. In this description and the claims that follow, term "STAP agent" and "monitoring agent" are used as synonyms. An STAP agent 102, 103 collects data and forwards it to the collector 104. A monitoring agent 102, 103 typically runs on the same computer as a monitored application. In the example, the collector 104 runs on computer system 110A. An audit repository 112 may be stored on the computer system 110A. In addition, there may be additional components for analyzing and interpreting collected data that work with the collector 104 that are installed on the computer system 110A, but which are not shown in FIG. 1. STAP agents 102A and 102B, and monitored applications 106 and 107, respectively, run on computer systems 110B and 110C. In the example, the computer system 110D includes a process VM 114. A monitored application 108 runs in the process VM 114 and an STAP agent 103 is installed on the computer system 110D. The STAP agent 103 on system 110D may include components that run inside or outside of the process VM 114 in various embodiments, as explained below. In addition, the computer system 110D includes listening code 304 that runs in the process VM 114. The listening code 304 may be considered as part of the monitoring agent 103, however, it is shown separately for clarity.

As one example, an STAP agent 102 or 103 can be installed on the same computer system hosting a server that is receiving local and network traffic. The server could be, for example, a database server, an application server, a file server, or other type of server. The STAP agent 102, 103 located with the server can intercept traffic between the server and various clients. The STAP agent 102, 103 copies data, such as type of command and client identity, from the client-server traffic. However, the STAP agent 102, 103 generally does not analyze or interpret the copied data. The STAP agent 102, 103 typically formats the collected data into a form that facilitates transmission. Specifically, the STAP agent 102, 103 may format the collected data using a serialization technique to encode the raw data into structured data. The STAP agent 102, 103 then forwards the collected data to the collector 104. The collector 104 may analyze and interpret the collected data. The collector 104 may store the collected data in the audit repository 112. Data stored in the audit repository 112 may be used to audit the server. In addition, the collector 104 may determine from its analysis that action is necessary to prevent unauthorized access to information stored on the server. The collector 104 may use any know methods and techniques to analyze and interpret the collected data. As mentioned, there may be components not shown in FIG. 1 installed on the computer system 110A that work with or assist the collector 104 in analyzing and interpreting the collected data.

In some embodiments, the collector 104 is a central server for an enterprise and the audit repository 112 is a centralized repository of audit data. There may be many computer systems 110 and many applications in an enterprise. STAP agents may be deployed to audit many different types of applications on multiple systems within the enterprise. In these embodiments, many STAP agents 102, 103 may communicate with the same collector, such as via a network 120. In addition, there can be multiple STAP agents 102, 103 and multiple monitored applications on any given computer system 110. Each computer system 110 may have one or more STAP agents 102, 103 that collect and forward data to the collector 104 on the central server.

In other embodiments, however, a system for monitoring or auditing an application that runs in a process VM may include a single STAP agent 103 and a single collector 104. The STAP agent 103 and collector 104 may or may not run on the same computer system. In some but not all embodiments, a system for monitoring or auditing an application that runs in a process VM may be the IBM® Guardium® platform.

Embodiments are directed to a monitoring agent 103 that runs in parallel with a monitored application 108 and which may include components running in a process VM 114, as well as components that may run in a separate process. Embodiments may provide advantages over STAP agents that are deployed: (a) in an application layer; or (b) in an operating system layer. Where an STAP agent is deployed in the application layer, it may be deployed as a one-off development project in which a unique STAP agent is developed for each application to be monitored. The deployment of STAP agents in the application layer may not be efficient or scalable because each STAP agent is unique.

An STAP agent deployed in the operating system layer works by identifying and intercepting device driver or kernel system calls used by the monitored application at runtime. This approach, however, may be inefficient and complex when the monitored application runs in a process VM. If the STAP agent is deployed in the operating system layer to monitor an application running in a process VM, the STAP agent is linked to the process VM running the application rather than directly to the monitored application. The process VM introduces an additional layer of abstraction between the monitored application and the STAP agent that is collecting data. This extra layer of abstraction can reduce performance and efficiency. In addition, the extra layer makes it difficult to determine which traffic and data flows are the correct ones to intercept, which in turn makes the monitoring process more complex.

STAP agents 103, according to disclosed embodiments, may be advantageous over STAP agents deployed in the application layer because they may not need to be completely specific or entirely unique for each monitored or audited application, yet at the same time reside at a level that is closest to the monitored application. STAP agents 103, according to disclosed embodiments, may include significant sections of reusable code and may require only small sections of application-specific code. In addition, STAP agents 103 according to the disclosed embodiments may insert listening code that runs inside the process VM alongside or as part of the monitored application, which may enable the efficient interception of function calls or collection of other data in a compiled version of the monitored application. Further, STAP agents 103, according to various embodiments, may be advantageous over STAP agents deployed at the operating system layer because they eliminate the layer of abstraction introduced by the process VM, improve efficiency, and reduce complexity.

Embodiments are directed to linking components of an STAP or monitoring agent 103 to listening code 304 in a compiled native application code. This linking may be performed at runtime. In particular, embodiments are directed to a generalized monitoring agent for a process VM. The generalized monitoring agents can be used with the set of known (or hereafter developed) VMs for the Java® virtual machine (JVM or Java VM) specification. In this description, embodiments are described with reference to a typical VM in the set of VMs for the JVM specification. However, generalized agents according to the principles of the invention are not limited for use only with a Java VM. Embodiments can be used with any process VM that provides a suitable application programming interface (API), or linking facility, or both, as described below. As one example, some embodiments may be implemented with the process VM of the Common Language Infrastructure (Microsoft® .NET). Before describing additional details of several embodiments, some features of an example virtual machine, namely the Java VM, are reviewed.

The source code instructions of an application developed to be run in a process VM can be written in the Java programming language (Java or Java language) and embodiments may be described with respect to the Java language. However, generalized agents for a process VM according to the principles of the invention may be deployed in an environment where any suitable programming language is used, e.g., JPython or JRuby. A programming language for a process VM may include software objects and classes.

The source code instructions of an application developed to be run in a process VM must be converted into an instruction set used by the underlying host computer. Generally, source code of an application is converted into an intermediate code or binary that the virtual machine executes. The term "virtual machine code" is used in this description to refer to compiled source code that is targeted for a virtual machine, which is known as "bytecode" for the Java VM. A compiler can be used to convert the source code into virtual machine code, e.g., bytecode. In a process VM, an interpreter can be used to convert the bytecode into lower level instructions, e.g., machine code, for use by the particular ISA or OS of the underlying host computer system. Alternatively, in many process VMs, a dynamic binary translator can be used to convert bytecode into the lower level instructions required by the host.

Java source code instructions (and the source code of other suitable programming languages) include software objects and classes. A software object is a construct that corresponds to an object in the real world. Software objects include fields that store the state of the software object and methods (also called functions) that perform some behavior. A class is a model for a software object. Multiple instances of a software object may be created from the blueprint provided by the class model. A class defines the fields and methods of an object. Software outside of an object interacts with the object using one of the object's methods. In Java, an interface can be defined. The interface is a collection of method signatures for one or more classes. The methods of the classes included in an interface may be similar types. An interface does not include code to implement the methods, the code for methods are contained in the objects for the specified classes. Accordingly, Java source code for a JVM, in particular, and source code for a process VM, generally, includes classes.

After source code is compiled into bytecode, it must be loaded before the process VM can execute it. The Java VM includes a default class loader to load class files into a memory space allocated to the JVM. The JVM also provides for user-defined class loaders that may be developed for a particular application. Classes may be defined in the source code or they may be predefined classes from one or more software libraries included with a particular process VM. A predefined class in a software library is typically accessed using an API. Different process VMs and different JVMs in the set of VMs for the JVM specification may have different software libraries and different available APIs. All Java applications have an entry point that starts the application. For many applications, the entry point is a function or method called "main." The entry point, which is often a main function, may call methods defined in the various classes of an application. A class loader typically loads a class at the time the particular class is used and not beforehand.

Figure 2:
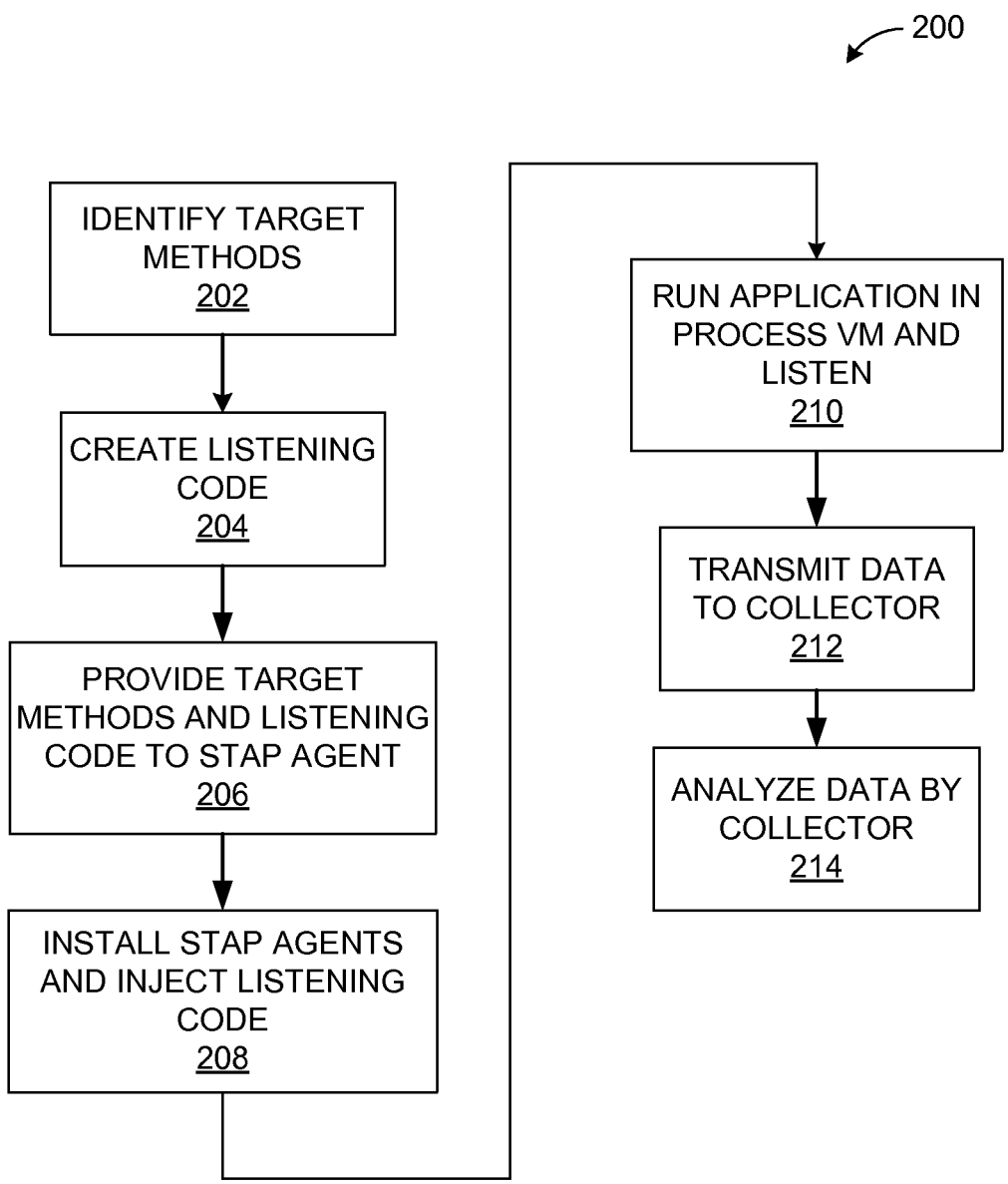
FIG. 2 is a flow diagram of a method for monitoring or auditing an application that runs in a process virtual machine, according to various embodiments.

FIG. 2 is a flow diagram of a method 200 for monitoring or auditing an application that runs in a process virtual machine, according to various embodiments. In operation 202, methods (or functions) to be monitored or audited are identified. A method or function to be monitored or audited may be referred to as a "target method." Each application to be monitored or audited will have one or more target methods that it may be desirable to monitor. Typically, the list of target methods is not large. The target methods may be identified by inspecting product documentation, a specification, by reverse engineering, or by examination of the application using debuggers, profilers, static analysis, or other tools.

In operation 204, "listening code" 304 is created for each target method. The listening code 304 is code that will be added to or "injected" into the target method. The listening code is typically a short set of compiled VM instructions. In various embodiments, the listening code is Java bytecode. The listening code can be created with any number of tools. For instance, there are several tools for Java that are capable of creating bytecode sequences for insertion. Examples of bytecode insertion tools include ASM, Javassist, and BCEL. Listening code 304 may need to be specific to a particular target method and it may be necessary for a developer to understand a few basic features about a target function. A target method may be analyzed using any of the methods initially used to identify the method, e.g., inspecting product documentation, a specification, by reverse engineering, or by examination of the application using debuggers, profilers, static analysis, or other tools. In various embodiments, it may not be necessary for the developer to inspect source code of the target application. Listening code 304 may be generic for use with many different target methods, such as in embodiments in which the listening code only inspects or copies arguments of a target method and does not contain references to fields within a target object. The listening code typically does not modify source or bytecode of the target method, rather it adds additional bytecodes. The listening code may make a copy of arguments passed to the method when it is invoked or values returned by the method when it finishes. The listening code may copy the name or other identifying parameters of the client that is causing the method to be invoked. In some cases, it may be desirable for the listening code to copy state information stored in a field of a software object after a method of the object has been performed.

In operation 206, one or more target methods are provided to and received by an STAP or monitoring agent 103. Operation 206 may include providing to and receiving by the STAP agent 103: the signature of the target method or the name of an object. The signature of a method may include the full name of the method and the parameter types of the methods parameters. In addition, the listening code 304 is provided to and received by the STAP agent 103 in operation 206. As mentioned, the listening code may be considered a component of the monitoring agent 103.

Figure 3A:
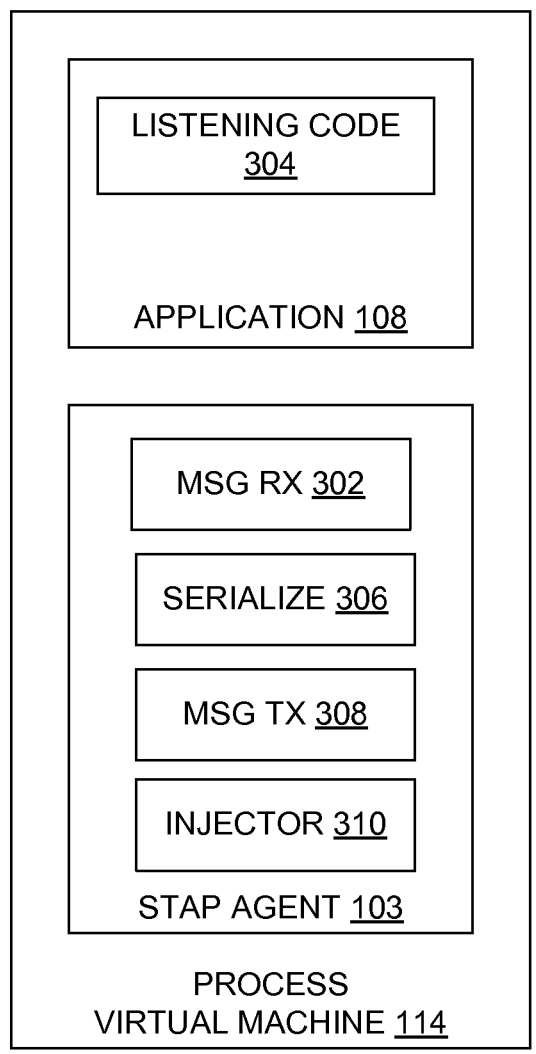
FIGS. 3A and 3B are block diagrams of examples of an STAP or monitoring agent and listening code.
Figure 3B:
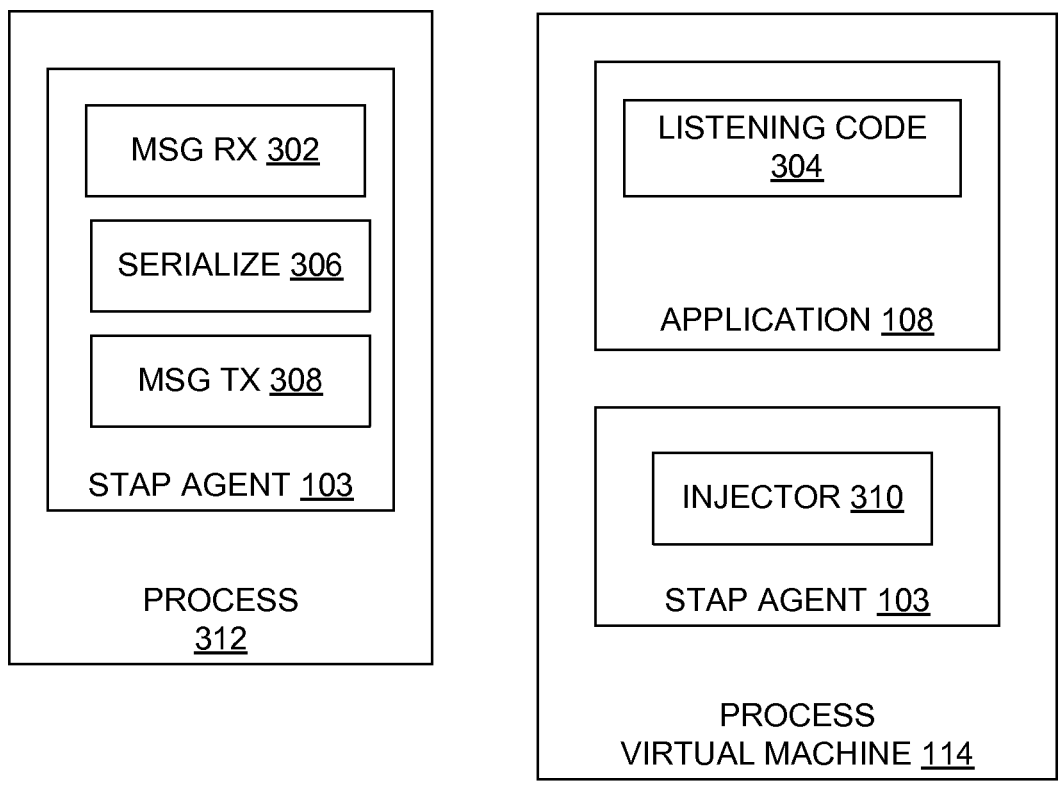

FIG. 3A is a block diagram showing an example of an STAP agent 103 and listening code 304 in which the STAP agent 103 runs inside the process VM 114. FIG. 3B is another example in which the STAP agent 103 includes some components that run outside of the process VM 114 in a process 312 and some components that run inside of the process VM 114. With respect to both FIGS. 3A and 3B, the STAP or monitoring agent 103 may include a message receiving module 302 for receiving messages from the listening code 304, a serialization module 306, a transmitting module 308 to forward serialized messages to the collector 104, and an injector module 310 to inject listening code into a monitored application. In addition, the STAP or monitoring agent 103 may include other modules not shown in the figure, such as a VM configuring module to configure a process VM for dynamic code instrumentation or to modify the class loading behavior of the process VM. At application runtime, the listening code 304 may intercept calls to or responses from a target method in monitored application 108, and may copy various data. Data may be copied from method call arguments and method return arguments. In various embodiments, the listening code 304 may copy data from an accessible field of an object. If the message receiving module 302 runs in the process VM it may receive messages directly from the listening code 304. If the message receiving module 302 runs in a separate process 312, it may receive messages from the listening code 304 via an inter-process communication (IPC) technique. The serialization module 306 can serialize the copied data. In some embodiments, the listening code 304 may serialize the copied data. The data can be serialized using Java serialization, Hadoop® serialization, Google® protobuf serialization, or any other suitable serialization application or technique. Serialization techniques encode structured data in an efficient format that is useful for programs that communicate with each other.

Referring again to FIG. 2, in operation 208, the STAP agent 103 is installed and the listening code 304 is injected into or with the monitored application. The STAP agent 103 may insert the listening code 304 at the beginning, or end of the target method, or at both locations. The STAP agent 103 can be installed and listening code 304 injected into or with the monitored application using several different techniques that are further described below. In the various insertion techniques, the listening code 304 may become part of the target method so that the listening code will be invoked when the target method is invoked.

The operation 208 may include storing the STAP agent 103 and the listening code in a memory device, as well as starting the STAP agent 103 and listening code 304. In various embodiments, the message receiving module 302, the transmitting module 308, and other modules must be active when the monitored application or process VM starts. The monitoring agent, including the transmitting module 308, may be run on the same computer system as process VM 114, but in a process separate from the process VM 114 and may have components, such as module 308, that are active at all times. In some alternatives, such as where the transmitting module 308 is not always active, a startup procedure for the agent may be installed or configured so that the transmitting module 308 is started at the same time that the application is started. In some embodiments, the startup of the process VM, may be modified so that the transmitting module 308 is started at the same time as the application. In other embodiments, the injected listening code may include instructions that start the monitoring agent.

In operation 210, the application to be monitored is run in the process VM. Simultaneously, the STAP agent 103 may be run, denoted as "listen" in the figure, in the same process VM as the monitored application (FIG. 3A). In alternative embodiments, various components of the STAP or monitoring agent 103 are run in a separate process that receives messages from the listening code via an inter-process communication (IPC) technique (FIG. 3B).

In operation 212, the STAP agent 103 transmits the data it collects to the collector 104. In operation 214, the collector 104 receives, analyzes, parses, and can store the data in audit repository 112 as necessary or desired. The collector 104 can use any know methods and techniques to analyze and interpret the collected data. The collector 104 can determine that action is necessary to prevent unauthorized access to information stored on the server. The collector 104 can issue alerts, or instruct the STAP agent 103 or other entity to take action, when an intrusion has been detected.

The STAP agent 102 can be installed and listening code injected into or with the monitored application using several different techniques. These techniques include dynamic code instrumentation, changing the class loading behavior of the code of the monitored application, and static code instrumentation.

Dynamic Code Instrumentation

In various embodiments, the listening code 304 may be injected or inserted using dynamic code instrumentation. With dynamic code instrumentation, listening code can be injected into a target method at runtime using an API. In various embodiments, the listening code may be injected using the interface instrumentation API of the Java® VM Tool Interface (JVM TI). Dynamic code instrumentation can change one or more existing classes of the monitored application. In particular, dynamic code instrumentation can add bytecode to a class file at the time the class is loaded. Dynamic code instrumentation is relatively nonintrusive, but requires a process VM that supports dynamic instrumentation and this feature may not be available in every process VM.

Figure 4:
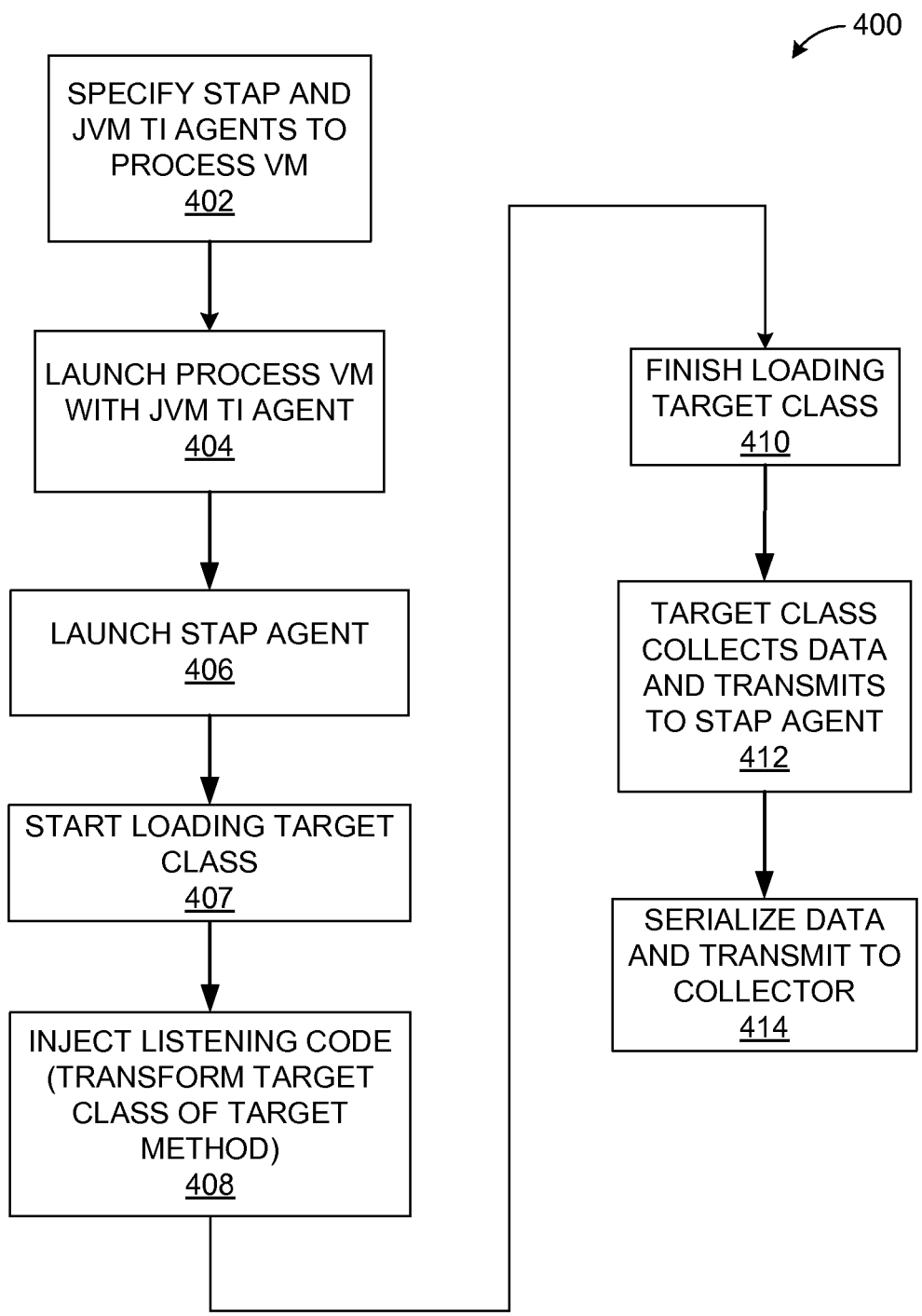
FIG. 4 is a flow diagram of a method for injecting an STAP or monitoring agent and listening code into an application that runs in a process virtual machine using dynamic instrumentation, according to various embodiments.

FIG. 4 is a flow diagram of a method 400 for injecting an STAP agent 103 and listening code into an application that runs in a process virtual machine using dynamic instrumentation, according to various embodiments. According to various embodiments, a process VM includes an API providing a capability to transform classes of a monitored application at load time. As one example, the JVM TI provides an Interface Instrumentation class that provides services to instrument a monitored application. The JVM TI includes a ClassFileTransformer interface that is implemented with a JVM TI agent, which may also be referred to as an instrumentation agent. A Transform method of the API transforms a supplied class file and returns a new replacement class file. In operation 402, an STAP agent 103 and a JVM TI agent are specified to a process VM. The process VM can be configured to start the STAP agent 103 when the VM starts up. Alternatively, the process VM can be configured to start the STAP agent 103 after the process VM is launched but prior to loading a class file for a target method. In operation 404, the process VM with the JVM TI agent is launched. The JVM TI or instrumentation agent can be informed of various events that occur in the monitored application. When an event occurs, the JVM TI agent can perform various operations, such as transforming a class file, i.e., adding bytecodes to class file. In various embodiments, loading or requesting to load a class file is an "event" that causes that instrumentation to transform a class file. In other embodiments, an "event" can relate to circumstances occurring after a class is already loaded. In these embodiments, a class can be modified multiple times and can be returned to its original state. In these embodiments, different versions of listening code 304 can be provided or no listening code 304 can be provided in responses to different operating conditions. For instance, a more intrusive version of listening code 304 may be provided when an event indicates circumstances of associated with high risk or a less intrusive version of listening code 304 may be provided when an event indicates circumstances of associated with low risk. In operation 406, the STAP agent 103 is launched. In operation 407, the monitored application is started. In addition in operation 407, application execution proceeds to a point where a target class is needed by the monitored application and loading of the target class begins at this point. In operation 408, in various embodiments the event is loading the target class, and the JVM TI agent injects listening code into the target method of the target class of the monitored application, thereby transforming the target class of the target method. In operation 410, the process VM 114 finishes loading the target class of the target method. When the target class of the monitored application is invoked, the listening code 304 collects data and transmits it to the receiving module 302 of the STAP agent 103 (operation 412). The STAP agent 103 may employ the serialize module 306 to serialize the collected data and use the transmit module 308 to transmit the data to the collector 104 in operation 414.

Changing Class Loading Behavior

Figure 5A:
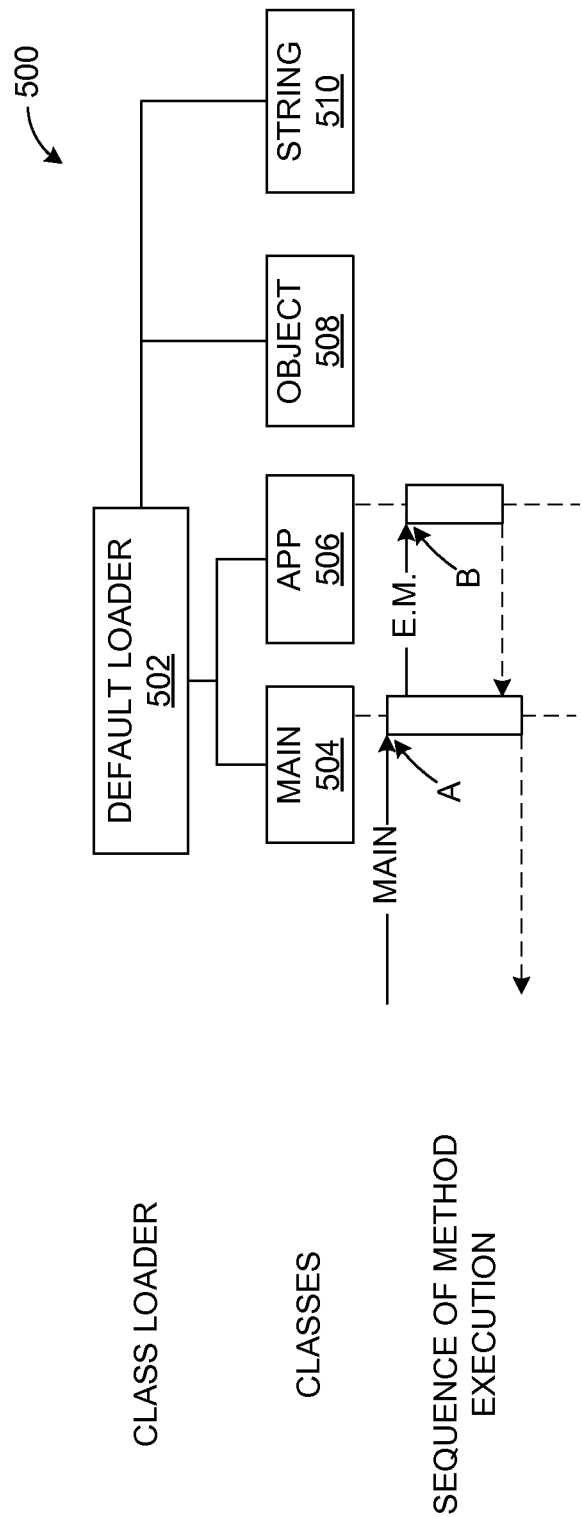
FIGS. 5A and 5B respectively depict schematic diagrams for loading an application without an STAP or monitoring agent, and for loading a monitored application with an STAP or monitoring agent according to various embodiments.
Figure 5B:
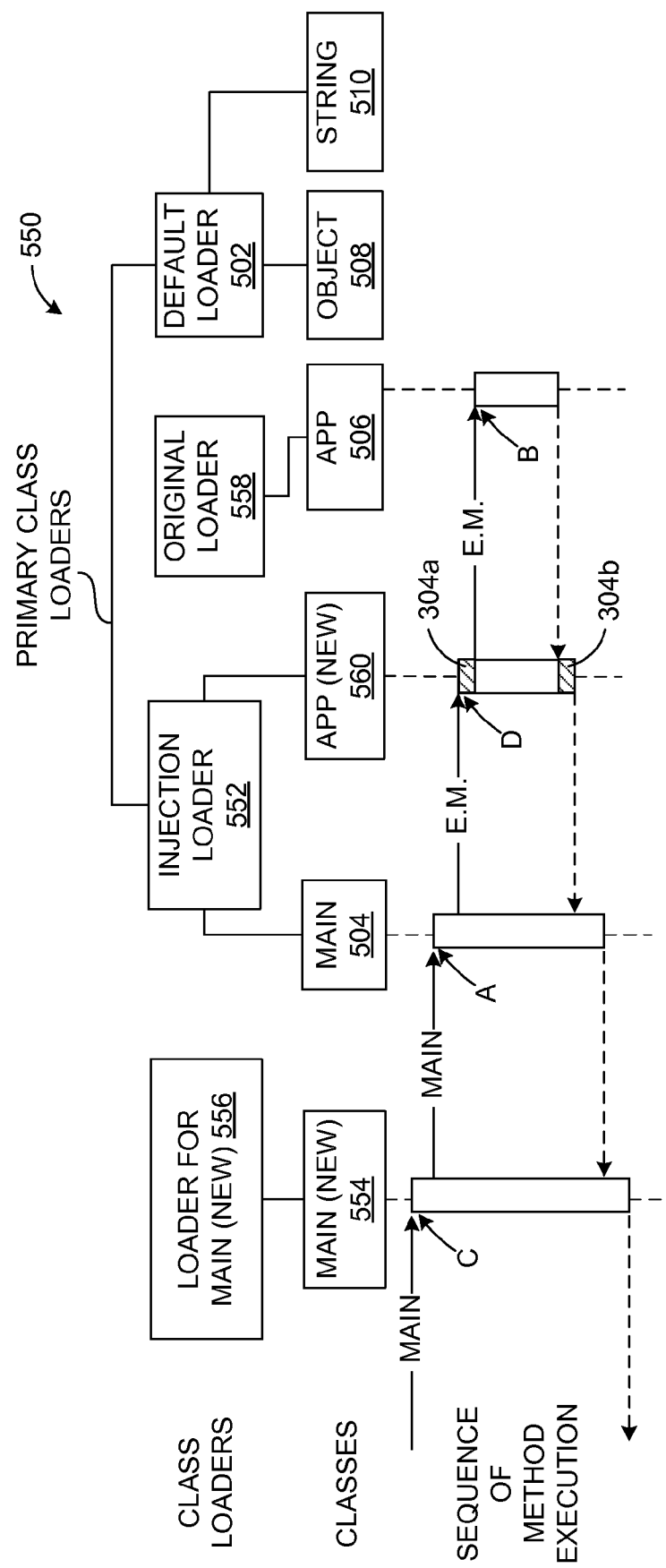

FIG. 5A depicts a schematic diagram 500 for loading an application without an STAP or monitoring agent 103. In addition, FIG. 5B depicts a schematic diagram 550 loading a monitored application with an STAP or monitoring agent 103 according to various embodiments. Referring first to the diagram 500 of FIG. 5A, class loaders, classes, and a sequence of method execution are respectively shown at top, middle, and bottom levels or rows of the figure. In the example of FIG. 5A, a default class loader 502 loads a main class 504. The default class loader 502 is created by the JVM. As mentioned, Java applications include an entry point, which is often a main function. The main function generally calls various other functions or methods of an application. In the example shown in FIG. 5A, the main class 504 may be a class that corresponds with a main function, having an entry point "A," that calls other functions of the monitored application. In this example, the main function calls a target method defined by a target class called app 506. In FIG. 5A, the default class loader 502 also loads the target app class 506, which contains an entry point "B" of the target method. In addition, the default class loader 502 loads object class 508 and string class 510. The object class 508 and string class 510, in FIGS. 5A and 5B, are generic and represent all non-target classes of the monitored application. When an object corresponding with main class 504 is invoked, the main object calls a target method in a target object corresponding with the target app class 506. The main object calls the target method in order to perform some operation (labeled "E. M." for "execute method" in FIGS. 5A and 5B). The target method corresponding with target app class 506 is executed to perform the operation and on completion returns control to the object corresponding with main class 504.

Referring to the diagram 550 of FIG. 5B, class loaders, classes, and a sequence of method execution are again respectively shown at top, middle, and bottom levels or rows of the figure. FIG. 5B shows the original classes of the monitored application, namely, main class 504, target app class 506, object class 508, and string class 510. These classes are necessary because the monitored application is to run as it would normally run without monitoring by an STAP agent 103. The diagram 550 includes a new main class 554, which may also be referred to as a mirror main class or a first mirror class. The new main class 554 contains a new (or mirror) entry point "C" for the monitored application. In addition, a new (or first) class loader 556 for new main class 554 is provided. The process VM 114 is provided with a class loader ordering instruction that specifies that new class loader 556 is to be used before using default class loader 502. Thus, the installation process, which includes new class loader 556 and new main class 554, replaces the entry point A of the monitored application with a new minor entry point C. This installation process changes the class loader in use by the application for loading a main class from the default class loader 502 to a new class loader 556.

The object corresponding with new main class 554 calls the object corresponding with main class 504, which includes the original entry point A of the monitored application. Because the new main class 554 has the same name as the main class 504 of the monitored application, a different class loader is needed for the main section class 504. An injection class loader 552 is provided to load the main class 504 of the monitored application. When a method of the new main class 554 is used as the entry point to the monitored application, the injection class loader 552 puts itself in front of the default class loader 502 by loading the original main class 504 itself. Execution proceeds from there into the original main class 504, and from that point on whenever a class needs to be loaded, the process virtual machine will defer to the injection class loader 552 to load the class. Accordingly, whenever the monitored application needs a class, the request is directed to the injection class loader 552. Accordingly, the injection class loader 552 determines which class is returned in response a request for a class. The injection class loader 552 may itself return a class or the injection class loader 552 may delegate the task to another class loader, such as the default class loader 502 or an original loader 558. As shown in FIG. 5B, the injection class loader 552 delegates the tasks of returning object class 508 and string class 510 to the default class loader 502. Further, as shown in FIG. 5B, the injection class loader 552 may delegate the tasks of returning the original target app class 506 to the original loader 558, which is so called because it loads an original class.

In addition to providing a new entry point C for the monitored application, the installation process includes a new app class 560, which replaces the entry point B of the target method with a new (or minor) entry point "D." The injection class loader 552 loads new app class 560, which may also be referred to as a minor app class. When a class of a target method is to be loaded, injection class loader 552 loads the minor class for that class instead of the original. For all other classes of the monitored application, the injection class loader 552 may defer to another class loader, such as the default class loader 502, to load the classes of the monitored application. In various embodiments, when a class of a target method is to be loaded, the injection class loader 552 loads a minor class, replacing the default class loader 502 of the monitored application.

The new (or mirror) app class 560 defines an object that includes listening code 304 and mirror entry point D, and which calls a target method defined by target app class 506 of the monitored application. When the target app class 506 is needed, the injection class loader 552 is configured to load both new app class 560 and target app class 506. Stated in different terms, the injection class loader 552 is configured to load both the minor app class 560 and the original (or mirrored) app class 506. Because they have the same name, there is a JVM requirement that the target app class 506 be loaded by a different class loader than the injection class loader 552. Accordingly, the injection class loader 552 loads the minor app class 560 itself and delegates loading of the target app class 506 to another class loader—the original loader 558. When a method defined by new app class 560 is invoked, the listening code 304a can be executed, and after it begins executing, the target method defined by target app class 506 is invoked, as indicated by the execute method (E.M.) arrow. In addition, after the target method finishes executing and control is returned to the method defined by mirror app class 560, listening code 304b can be executed. Listening code 304 can perform data gathering operations either before it invokes the target method or after control is returned to it, or at both points.

As mentioned, both the new main class 554 and the new app class 560 may be referred to as a mirror class containing minor entry points. These classes are minor classes in the sense that they impersonate the main and app classes of the monitored application. The mirror classes have the same names as the original or mirrored classes in the application. It should be understood, that the technique for loading of the monitored application with an STAP agent 103 depicted diagram 550 assumes the application to be monitored uses the default class loader of the process VM. If the monitored application uses a class loader other than the default class loader, the technique may require modification and another technique for inserting listening code may be more desirable.

Static Code Instrumentation

In various embodiments, the listening code may be inserted into a target method using static code instrumentation. This technique involves either compiling source listening code 304 into virtual machine code or developing listening code 304 as virtual machine code in the first instance. As mentioned, virtual machine code refers to compiled source code that is targeted for a virtual machine, which is known as bytecode for the Java VM. The listening virtual machine code may be inserted into a target class file of the target method. The target class file containing the inserted listening virtual machine code may be saved in a memory. When the target class is needed, a class loader, e.g., the default class loader, may load the target class file having the listening virtual machine code. Listening virtual machine code can be inserted into the target class file using any suitable static instrumentation tool. One example of static instrumentation tool is the Japt bytecode optimizer. After the listening virtual machine code is inserted into the class file, the class may be loaded by the class loader specified for the monitored application. When the monitored application is running, the listening virtual machine code may transmit messages to the message receiving module 302 of an STAP agent 103 according to any of the described embodiments.

Figure 6:
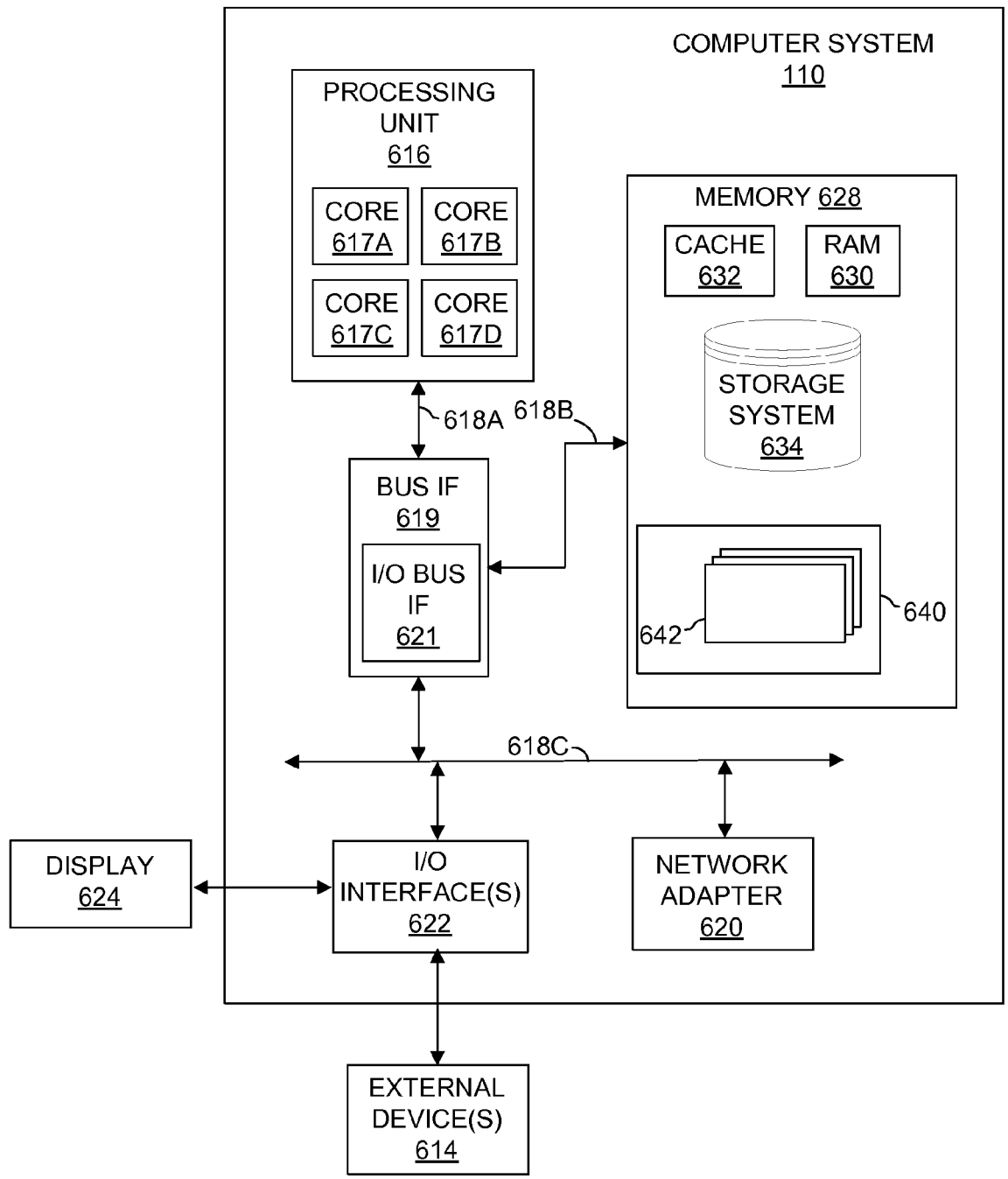
FIG. 6 is a block diagram of an example of a computer system in which embodiments can be implemented.

FIG. 6 is a block diagram of an example of a computer system 110 in which embodiments can be implemented. The computer system 110 may be a general-purpose computing device. The components of computer system 110 may include, but are not limited to, one or more processors or processing units 616, a system memory 628, and buses 618A, 618B, and 618C that couple various system components including system memory 628 to processor 616.

The processing unit 616 may contain multiple processors in various embodiments. Alternatively the processing unit 616 may include a single processor. Each processor 616 executes instructions stored in the memory 628 and may include one or more levels of on-board cache. The processing unit 616 may be configured to execute instructions, i.e., run, the monitoring agent 102, 103, the collector 104, the listening code 304, and the monitored applications 106, 107, 108, as well as the process virtual machine 114. Each processor 616 may include one or more cores 617, e.g., cores 617A-617D.

The buses 618A, 618B, and 618C represent one or more of any of several types of bus structures, including a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus, and PCI express (PCIe). The computer system 628 may include a bus interface 619 and an I/O bus interface 621. The bus interface 619 may include a memory controller (not shown).

Computer system 110 typically includes a variety of computer system readable media. Such media may be any available media that is accessible by computer system 110, and may include both volatile and non-volatile media, removable and non-removable media.

System memory 628 may include computer system readable media in the form of volatile memory, such as random access memory (RAM) 630 or cache memory 632. Computer system 110 may further include other removable/non-removable, volatile/non-volatile computer system storage media. By way of example only, storage system 634 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disk such as a CD-ROM, DVD-ROM or other optical media can be provided. In addition, memory 628 can include flash memory, e.g., a flash memory stick drive or a flash drive. Memory devices can be connected to bus 618 by one or more data media interfaces. The memory 628 may include at least one program product having a set (e.g., at least one) of program modules that are configured to carry out the functions of various embodiments. For example, the memory 628 may store any of the programs shown in FIG. 1, i.e., STAP or monitoring agent 102, 103, collector 104, monitored applications 106, 107, 108, and process virtual machine 114. In addition, the memory 628 may store program data, such as audit repository 112.

One or more programs/utilities 640, each having a set (at least one) of program modules 642 may be stored in memory 628. The programs/utilities 640 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Program modules 642 generally perform the functions or methodologies of various embodiments.

Computer system 110 may communicate with one or more external devices 614 such as a keyboard, a pointing device, a display 624; one or more devices that enable a user to interact with computer system 110; or any devices (e.g., network card, modem, etc.) that enable computer system 110 to communicate with one or more other computing devices. Such communication can occur via one or more Input/Output (I/O) interfaces 622. In addition, computer system 110 may communicate with one or more networks, such as a local area network (LAN), a general wide area network (WAN), or a public network (e.g., the Internet), via one or more network adapters 620. As depicted, network adapter 620 communicates with the other components of computer system 110 via bus 618. Although not shown in FIG. 6, other hardware or software components may be used in conjunction with computer system 110. Examples, include, but are not limited to: microcode, device drivers, redundant processing units, external disk drive arrays, RAID systems, tape drives, and data archival storage systems.

In various embodiments, the computer system 110 may be a multi-user mainframe computer system, a single-user system, or a server computer or similar device that has little or no direct user interface, but receives requests from other computer systems (clients). In other embodiments, the computer system 110 may be implemented as a desktop computer, portable computer, laptop or notebook computer, tablet computer, pocket computer, telephone, smart phone, or any other appropriate type of electronic device.

The computer system 110 may include some or all of the hardware and/or computer program elements of the computer system 110. The various program components implementing various embodiments of the various embodiments may be implemented in a number of manners, including using various computer applications, routines, components, programs, objects, modules, data structures, etc., and are referred to herein as "computer programs," or simply "programs."

The computer programs include one or more instructions or statements that are resident at various times in various memory and storage devices in the computer system 110 and that, when read and executed by one or more processors in the computer system 110, or when interpreted by instructions that are executed by one or more processors, cause the computer system 110 to perform the actions necessary to execute steps or elements including the various aspects of embodiments of the various embodiments.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of exemplary embodiments of the various embodiments, reference was made to the accompanying drawings (where like numbers represent like elements), which form a part hereof, and in which is shown by way of illustration specific exemplary embodiments in which the various embodiments may be practiced. These embodiments were described in sufficient detail to enable those skilled in the art to practice the embodiments, but other embodiments may be used and logical, mechanical, electrical, and other changes may be made without departing from the scope of the various embodiments. In the previous description, numerous specific details were set forth to provide a thorough understanding the various embodiments. But, the various embodiments may be practiced without these specific details. In other instances, well-known circuits, structures, and techniques have not been shown in detail in order not to obscure embodiments.

Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of rows, records, entries, or organizations of data may be used. In addition, any data may be combined with logic, so that a separate data structure may not be necessary. The previous detailed description is, therefore, not to be taken in a limiting sense.

While this disclosure has described the details of various embodiments shown in the drawings, these details are not intended to limit the scope of the inventions as claimed in the appended claims.

What is claimed is:

1. A system for monitoring an application executing on a process virtual machine, the system comprising:
   a memory to store a monitoring agent, the process virtual machine, and the application; and
   a processor to:
      run the monitoring agent, the process virtual machine, and the application;
      receive an identification of a target class of the application by the monitoring agent;
      configure the target class for monitoring by
         injecting listening code into the target class to generate a first minor class, wherein the first mirror class includes a minor entry point to the application, a mirror entry point to the target class and at least a sequence of computer executable code, including the listening code, not present computer executable code of the target class,
         integrating the first mirror class into the application, and
         configuring the process virtual machine to use a first class loader to load the first mirror class;
      load the first mirror class in response to a request to load the target class;
      run, subsequent to loading the first mirror class, the listening code, wherein the listening code executes within the first mirror class integrated into the application to collect data and to send the collected data directly to the monitoring agent; and
      send the collected data from the monitoring agent to a collector, wherein the collector is operable to analyze the collected data to identify an unauthorized access to the application.

2. The system of claim 1, wherein the configuring of the target class for monitoring by listening code includes:
   configuring the process virtual machine to provide a notification of an event concerning the target class; and
   installing the listening code in the target class in response to the notification of the event.

3. The system of claim 2, wherein the event is related to circumstances associated with a level of risk and the event occurs after the target class has been loaded.

4. The system of claim 1, wherein the configuring the target class for monitoring by listening code includes:
   injecting listening virtual machine code to the target class before running the application.

5. The system of claim 1, further comprising serializing the collected data by the monitoring agent.

6. The system of claim 1, wherein the collected data includes a value returned by a target method of the target class.

* * * * *